US009654595B2

(12) United States Patent
Carr et al.

(10) Patent No.: US 9,654,595 B2
(45) Date of Patent: May 16, 2017

(54) DYNAMICALLY AGGREGATING AND CONFIGURING ACCESS TO SOCIAL NETWORKING CONTACTS

(71) Applicant: Mayhem Development, LLC, Lebanon, MO (US)

(72) Inventors: James Edward Carr, Lebanon, MO (US); Nathan Douglas England, Ozark, MO (US)

(73) Assignee: Mayhem Development, LLC, Lebanon, MO (US)

( * ) Notice: Subject to any disclaimer, the term of this patent is extended or adjusted under 35 U.S.C. 154(b) by 544 days.

(21) Appl. No.: 14/159,630

(22) Filed: Jan. 21, 2014

(65) Prior Publication Data

US 2014/0207865 A1    Jul. 24, 2014

Related U.S. Application Data (60) Provisional application No. 61/755,050, filed on Jan. 22, 2013.

(51) Int. Cl.
  *G06F 15/16* (2006.01)
  *H04L 29/08* (2006.01)

(52) U.S. Cl.
  CPC ........ *H04L 67/306* (2013.01); *H04L 67/2833* (2013.01)

(58) Field of Classification Search
  CPC ..................... H04L 67/306; H04L 67/2833
  See application file for complete search history.

(56) References Cited

U.S. PATENT DOCUMENTS

| 7,925,620 | B1 | 4/2011 | Yoon |
| 2003/0019935 | A1 | 1/2003 | Giannulli |
| 2007/0096909 | A1 | 5/2007 | Lally |
| 2008/0256170 | A1 | 10/2008 | Hayashi et al. |
| 2009/0117883 | A1 | 5/2009 | Coffing et al. |

(Continued)

FOREIGN PATENT DOCUMENTS

| KR | 10-2010-0110145 A | 10/2010 |
| KR | 10-2012-0045217 A | 5/2012 |

(Continued)

OTHER PUBLICATIONS

"International Search Report and Written Opinion for PCT Application No. PCT/US2014/012396", Mailed Date: Apr. 29, 2014, Filed Date: Jan. 21, 2014, 11 pages.

(Continued)

*Primary Examiner* — Viet Vu (57) ABSTRACT

Embodiments dynamically aggregate and configure access to social networking contacts. A server system receives information from one or more users enrolled into the server system. The information includes a list of social networking accounts of which each of the users is a member, and a visibility status associated with each of social networking accounts. The server system provides a first list of social networking accounts having a first visibility status of a first user of the server system to a second user of the server system when the second user has a second list of social networking accounts that corresponds to the first list of social networking accounts that is set to the same visibility status as the first visibility status of the first list of social networking accounts.

17 Claims, 9 Drawing Sheets

(56) References Cited

U.S. PATENT DOCUMENTS

| | | |
|---|---|---|
| 2009/0249451 A1 | 10/2009 | Su et al. |
| 2010/0005520 A1 | 1/2010 | Abbot et al. |
| 2010/0036936 A1 | 2/2010 | Cox et al. |
| 2010/0088372 A1 | 4/2010 | Shridhar et al. |
| 2011/0004561 A1* | 1/2011 | Shahine ............... G06Q 10/107 705/319 |
| 2012/0131477 A1 | 5/2012 | Marsden |
| 2012/0143969 A1* | 6/2012 | Shenoy .................. G06Q 10/10 709/206 |
| 2012/0168493 A1 | 7/2012 | Worms et al. |
| 2012/0168497 A1 | 7/2012 | Yach |
| 2013/0218902 A1* | 8/2013 | Vendrow ........... G06F 17/30867 707/748 |

FOREIGN PATENT DOCUMENTS

KR    10-2012-0137625 A    12/2012
WO    2012044257 A1    4/2012

OTHER PUBLICATIONS

Sawers, "QRLme Creates QR Codes for Social Profiles", Retrieved from <<http://thenextweb.com/apps/2011/09/27/qrlme-creates-qr-codes-for-social-profiles/>>, Sep. 27, 2011, 3 pages.

Moss, "Generate Social Network Profile QR Code—WP Plugin", Retrieved from <<http://qrmedia.us/generate-social-network-profile-qr-code-wordpress-plugin/>>, Jan. 4, 2012, 6 pages.

Tramp, "Weaving a Distributed, Semantic Social Network for Mobile Users", Universitat Leipzig, Institut fur Informatik, AKSW, Germany, 2011, 15 pages.

Hogben, "Security Issues in the Future of Social Networking", Retrieved from <<http://www.w3.org/2008/09/msnws/papers/Future_of_SN_Giles_Hogben_ENISA.pdf>>, Dec. 31, 2008, 5 pages.

* cited by examiner

DYNAMICALLY AGGREGATING AND CONFIGURING ACCESS TO SOCIAL NETWORKING CONTACTS

CROSS-REFERENCE TO RELATED APPLICATIONS

This application claims priority to U.S. Provisional Patent Application No. 61/755,050, filed on Jan. 22, 2013, which is hereby incorporated by reference herein for all purposes.

BACKGROUND

Social networking through the Internet allows individuals to communicate with other individuals in a timely and convenient manner. Some popular public social networking sites include Facebook®, Linkedin®, Myspace, and Twitter®. Once an individual becomes a member of one of these and other social networking sites, it is typical to build a network of other members for business connections, to renew old friendships, to establish new friendships, to discuss matters or hobbies, and to connect with family members.

Social networking sites typically require an individual to have a device that connects to the Internet, with the device being a computer using a browser or a provider-specific computer or mobile device application. To become a member of a social networking site, an individual navigates to the website and establishes an account by selecting a unique user identifier or name, and a password. Once an account has been setup, the individual may access the account by logging in using the user identifier and the password. An individual may be a member on multiple social networking sites. This requires that the individual establish an account on each social networking site. It is possible that the unique identifier on one site may not be available for selection on another site. If this occurs then the individual must remember multiple different identifiers and associated passwords for each social network site for which the individual becomes a member. This also complicates establishing connections in that the individual has to provide the different identifiers for each social network site to other individuals that want to connect to the individual on the various social network sites.

Some problems associated with being a member of a social network are how to select contacts or members that you want to be associated with, and how to provide your contact information to other potential contacts. Although social network sites have the ability for you to invite other contacts, it may be cumbersome or difficult to determine which individuals you want to connect with on each individual social network site that you have established a membership. It is also possible, for various reasons, that you may find it desirable that an individual not know, or not find out, that you are a member of a particular social networking site. However, keeping track of this may be difficult if you become a member of numerous social networking sites. Another disadvantage to being on multiple social networking sites is that if a contact needs to be deleted from every social networking site, then each social networking site must be accessed to remove that particular contact.

The existing systems fails to dynamically aggregate and configure access to social networking contacts to provide for selectivity as to who you may connect with on various social networking sites. Further, the existing systems lack a mechanism to allow a user control as to which social networking sites another individual has knowledge of you being a member. The existing systems also fail to allow a user to easily remove an individual as a contact on multiple social networking sites.

SUMMARY

In one form of the disclosure, a system for dynamically aggregating and configuring access to social networking accounts is disclosed which comprises a server system for receiving information from one or more users enrolled into the server system, the information comprising a list of social networking accounts that each of the users is a member and a visibility status associated with each of social networking accounts, and the server system for providing a first list of social networking accounts having a first visibility status of a first user of the server system to a second user of the server system when the second user has a second list of social networking accounts that corresponds to the first list of social networking accounts that is set to the same visibility status as the first visibility status of the first list of social networking accounts.

In another form of the disclosure, a system for dynamically aggregating and configuring access to social networking accounts is disclosed which comprises a server system for receiving information from one or more users enrolled into the server system, the information comprising a list of social networking accounts that each of the users is a member and a visibility status associated with each of social networking accounts, and the server system for providing a list of first user social networking accounts having a visibility status of a first user of the server system disclosed to a second user of the server system when the second user has a list of second user social networking accounts containing a networking account that corresponds to an account on the list of first user social networking accounts that is set to the same visibility status as the first user visibility status of the list of first user social networking accounts.

In another form of the disclosure, a system for dynamically aggregating and configuring access to social networking accounts comprises a server system for receiving information from one or more users enrolled into the server system, the information comprising a list of social networking accounts that each of the users is a member and a visibility status associated with each of social networking accounts, and the server system for providing a first list of social networking accounts having a first visibility status of a first user of the server system to a second user of the server system when the second user has a second list of social networking accounts that corresponds to the first list of social networking accounts that is set to the same visibility status as the first visibility status of the first list of social networking accounts and a first customer device of the first user having a display screen and configured to run an application for the server system, the application for transmitting the information comprising the first list of social networking accounts and the first visibility status of each account in the first list of social networking accounts to the server system, and the first customer device for receiving various screens from the server system for display.

In yet another form of the disclosure, a method for dynamically aggregating and configuring access to social networking accounts comprises operations for enrolling in a system for dynamically aggregating and configuring access to social networking contacts, providing membership account information for each social networking account, and setting a visibility status for each social networking account for each account which will be visible to others having a corresponding account set to the same visibility status.

In light of the foregoing comments, it will be recognized that the disclosure provides a system and method for dynamically aggregating and configuring access to social networking contacts.

Aspects of the disclosure provide a system and method for dynamically aggregating and configuring access to social networking contacts in which information or data may be controlled or restricted by a user.

Aspects of the disclosure provide a system and method for dynamically aggregating and configuring access to social networking contacts in which various levels of information or data are visible to other users.

Aspects of the disclosure provide a system and method for dynamically aggregating and configuring access to social networking contacts in which various levels of visibility of information or data may be overridden to allow specific individuals access to the information or data.

Aspects of the disclosure provide a system and method for dynamically aggregating and configuring access to social networking contacts that provide the ability to delete a contact from every social networking site without having to access each site individually. For example, a "delete" message, transaction, or command may be broadcast from an application to each of the social networking sites of the user. The message requests deletion, within the social networking systems, via a mutual interface between the application and these social networking systems.

Aspects of the disclosure are directed to a system and method for dynamically aggregating and configuring access to social networking contacts which serves as a centralized repository or hub for user social media membership management and monitoring of accounts and account activity.

Aspects of the disclosure also provide a system and method for dynamically aggregating and configuring access to social networking contacts that also provide access to individuals who are members of other organizations other than social networking sites.

Aspects of the disclosure are further directed to a system and method for dynamically aggregating and configuring access to social networking contacts that allow users to search and broadcast events such as conferences, business meetings, and other events among multiple social networking sites or organizations. For example, an application in accordance with the disclosure creates various events from user input to broadcast to other users of the disclosure as well as broadcasting events to the user's individual social media accounts. Further, a communications interface is exposed for external social media sites to originate and send the event to the application to have the event broadcasted therein, even if the event originated in the external social media site.

Aspects of the disclosure provide a system and method for dynamically aggregating and configuring access to social networking contacts which is a flexible system in that any kind of interconnectivity of memberships such as social media, online dating, gaming, offline hobby, interests groups, political groups, conferences, events, and gatherings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

This disclosure relates to a system and method for dynamically aggregating and configuring access to social networking contacts through the use of computing devices, such as telecommunications devices. Exemplary computing devices include, but are not limited to, a computer, a tablet, and a mobile telephone.

Figure 1:
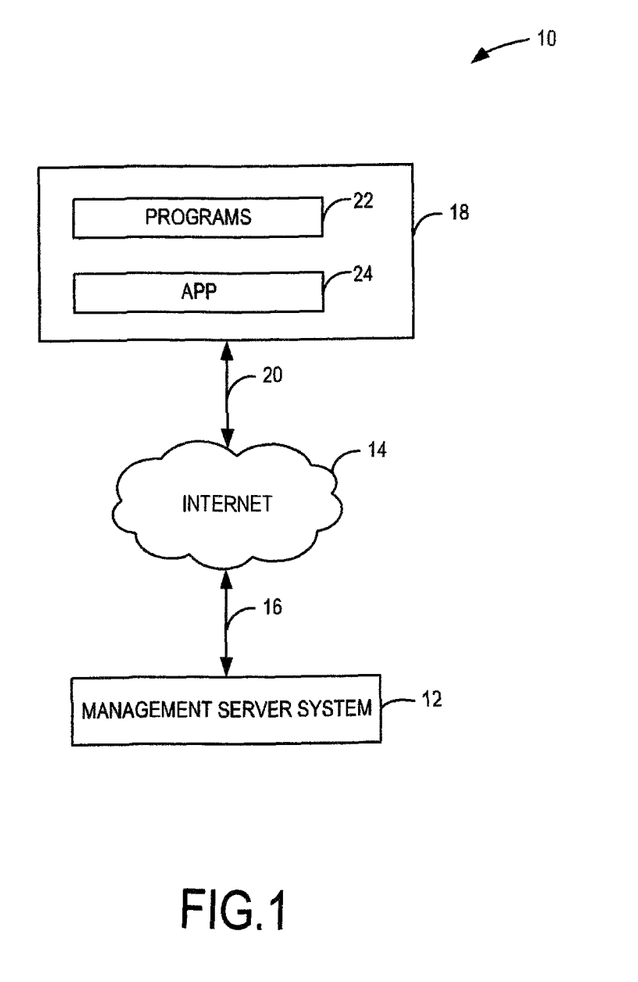
FIG. 1 is a block diagram of a system for dynamically aggregating and configuring social networking access contacts constructed according to the disclosure.

Referring now to the drawings, wherein like numbers refer to like items, number 10 identifies a system for dynamically aggregating and configuring social networking access contacts constructed according to the disclosure. With reference now to FIG. 1, the system 10 is shown to comprise a server system 12 (e.g., a management server system) that is connected to a communications network such as the Internet 14 via a connection 16. The server system 12 may comprise a computer network that is capable of storing software programs and data. The server system 12 may comprise a single computer system or a number of computer systems grouped together. The server system 12 may include a database for storing information of users that enroll in the system 10. The database may contain information such as user name, password, phone number, email address, home address, memberships at social networking sites, and visibility status within the system 10 for each social networking site. Further, by way of example only, the computer 12 may be a computer having a microprocessor, memory, a hard drive having stored thereon an operating system and other software, input devices such as a mouse or a keyboard, a CD-ROM drive, and a floppy disk drive. Other ancillary devices may be included such as a printer, a scanner, a modem, a router, or other network devices that allow the server system 12 to be connected to the Internet 14. The connection 16 may take on various forms such as a telephone line, cable, integrated services digital network (ISDN) lines, fiber optic lines, wireless connections, microwave, radio, satellites, or other connection devices or means.

A customer device 18, such as a computer, a tablet, a smart phone, or any other device which is capable of communicating with the server system 12, is also connected to the Internet 14 by a connection 20. The connection 20 may take on the same form or forms as the connection 16, but is typically a wireless connection or a wireless fidelity (WiFi) connection. The customer device 18 has the capability of having various programs 22, such as software programs or software applications, resident or stored in the device 18. One of the programs may be a web browser that allows for sending and receiving information to and from the server system 12. Another program may be an application 24 that has been downloaded for a particular social network site. Further, another application may be downloaded to the device 18 by use of a camera (not shown) resident in the device 18 that is capable of capturing an image or code, through the use of a generic Quick Response (QR) code reader application already resident on the device 18. This particular QR application directs the device 18 to a website to download the application 24. The application 24 may prompt the user of the device 18 to fill out various registration screens (e.g., user interfaces, displays, etc.) by inputting information through the device 18. It is also possible and contemplated to download the application 24 or a software program directly from the social network site without having to use the QR application. It is also possible that the user of the device 18 may set up an account directly at a website associated with the server system 12. In this manner, a cloud-based program at the server system 12 is provided.

By way of further example only, the customer device 18 may be other devices such as an iPod touch, a personal digital assistant (PDA), an iPad, a device that has WiFi connectivity, or other mobile communications device capable of sending and receiving data over a wireless network. Although not shown in any detail, the customer device 18 may have a microprocessor, memory, a hard drive having stored thereon an operating system and other software, input devices such as a mouse or a keyboard, a CD-ROM drive, and a floppy disk drive. Other ancillary devices may be included or attached to the customer device 18 such as a printer, a scanner, a modem, a router, or other network devices that allow the device 18 to be connected to the Internet 14. Further, although one customer device 18 is illustrated and discussed, it is possible and anticipated that more than one customer device 18 may be connected to the server system 12 over the Internet 14. It is also possible that a user of the system 10 may use different devices 18 to access the server system 12. For example, the user may not be near a computer and the user has to use a smart phone to access the server system 12.

The server system 12 has a software platform or program therein that is designed to enhance and facilitate person-to-person interconnectivity by aggregating, filtering, and exposing multiple users' disparate social media memberships by user-defined information sharing policies with other users associated with the server system 12. The server system 12 may have a website associated with it that has a web page or home page that acts as a portal to connect various individuals or members of the server system 12. Once each member is connected to the server system 12, information may be displayed as a user interface to the member. The user interface may contain relevant information that is displayed as a web page on a screen of the device 18. The information that may be displayed is based on the user's membership in various social network sites, interests, topics, subscriptions, followings, activities, and the like.

In particular, the server system 12 has a visibility hierarchy information sharing structure. The visibility hierarchy information sharing structure is used to limit the visibility of a user's membership information to the general public and between individuals that have been designated as friends. A user may find it advantageous to let the public know that the user is a member of one social network site, but membership in another particular social network site should be limited or restricted. For example, a user may not want it known to an employer that the user is a member of a gaming website. The hierarchy may include various levels. The top level may be a Public level that is visible or available to anyone who views or accesses the server system 12. In the public level, there are no restrictions. The next level down may be what is termed a "Show and Tell" level. The contents of this level are visible to anyone who is a user within the server system 12 and has a matching membership that is also flagged as a show and tell or higher visibility. The level below the Show and Tell level is the Friends Only level. In the Friends Only level, the contents are displayed only to anyone in the user's current contact list and not publicly exposed. The next level is termed the Friends Only-Show and Tell level. This level is visible to anyone in the user's current contact list and has a matching membership that is flagged as Friends Only-Show and Tell or higher visibility. A Private level is provided below the Friends Only-Show and Tell level. The Private level only allows access to the user and potentially to a user who is identified or flagged as a Best Friend. This level overrides visibility settings of Private and higher. The last level is known as the Private Invisible level. In the Private Invisible level, access is provided only to the user. This is the least visible setting and may be selected by the user to hide an account on the server system 12 from everyone including Best Friends.

The server system 12 has incorporated various security techniques or software that is used to secure or protect user information and authenticate transmissions between customer devices 18 and the server system 12. The architecture of the server system 12 is a server-client architecture with a data store. As previously indicated, client applications, such as show and tell (SnT) client applications, are provided for mobile devices and web user interface application. It is also possible that third party client software is able to access the server system 12 via a published application programming interface (API). Client applications interface with the server system 12 via API by sending requests and receiving responses form the server system 12. The server system 12 has a security layer or authentication service between the server system 12 and the user or client that authenticates all requests incoming to the server system 12.

To become a member of the server system 12 and to have access to the server system 12, the following exemplary procedure is employed. A potential user, customer, member, or client navigates to the website associated with the server system 12 by use of the customer device 18, or opens the application 24 resident on the customer device 18. The user selects a sign up option provided on a web page. The user enters user information to create an account on the server system 12. Exemplary user information includes a user name, a password, a valid email address, and other information such as address and a cellphone number. The server system 12 determines if there are no conflicts with the entered information. For example, if the desired user name already exists on the server system 12, the potential user is notified to select a different user name. The server system 12 prompts the user for some kind of human verification check such as entering a code that is presented on the screen. If the human verification check is successful then a new user account is created in the database on the server system 12 and the account is initially be flagged as inactive. The server system 12 sends an email verification request to the new user's email address. Once the new user opens the email verification request and the user is prompted to verify receipt of the request. As soon as the server system 12 receives the verification from the user, the account is identified as an active account. However, those skilled in the art will note that the disclosure is operable with any method for authenticating the user.

Once the account is activated, the user may log into the account. Logging into the account is accomplished in the following manner. The user navigates to the website associated with the server system 12 by use of the device 18, or opens the application 24 resident on the device 18. Aspects of the disclosure are operable with any mechanism for authenticating the user, such as two-step authentication. For example, a screen or web page is displayed for the user to enter the user name and password. The program 22 or the application 24 sends an authentication request to the authentication program or service of the server system 12. The authentication program then attempts to authenticate the user. The authentication program returns a response to the program 22 or the application 24. The device 18 handles whether authentication has been successful or not. If the authentication is successful then the user is allowed to view the user's home page on the server system 12.

After the user logs into the server system 12, the user is capable of populating the user's account with the various social network sites of which the user is a member. In particular, the user is presented a web page in which a button or tab identified as "Add Membership" may be selected. Once this button is selected, a new screen is presented in which the user may insert into a form any social network site of which the user is a member. The user may enter the uniform resource locator (URL) or web address for the user's home page at the particular social network site. In the displayed form presented to the user, the user sets the visibility of this membership. In some embodiments, the user is prompted to select one, and only one, of the visibility hierarchy levels such as Public, Show and Tell, Friends Only, Friends Only-Show and Tell, Private, and Private Invisible. Alternatively or in addition, the user is prompted to create a custom visibility based on explicit input from the user. The server system 12 stores the entered information for the particular social network site. The user may then enter other social network sites that the user is a member of and desires to have on the server system 12.

The user also has the capability of providing the user's full login information to a third party membership of the user's choosing into the server system 12. This is useful when the third party system allows a public API to access internal data to that specific system. In order to accomplish this, the user navigates to the "add membership" button and is prompted to enter the login information for the third party system. The user then sets the visibility for this account data, flagging it as public, private, or show and tell. This data is then securely stored in the server system 12.

The user has the ability to search the server system 12 to determine if a specific person is a member of the server system 12. The user may want to do this to link the user's memberships with the other person's memberships. For example, this would be the case where the user has a friend within one social media account and wants to determine if there are other accounts to make the person a friend. Person or account matches are found if a person's name matches the search query and returns only the search target's memberships that are visible to the user. The user conducts a search in the following manner. A screen is presented to the user that has a search option button or tab to find people within the server system 12. The user selects this button and then may enter a name to be searched. The server system 12 then conducts the search of the database of the server system 12. If a match is found then the server system 12 checks to determine if the matching user has any memberships exposed with public and show and tell visibility. The server system 12 filters and returns only the resulting memberships that are exposed as public as well as any accounts that are flagged as show and tell and are common with the user's memberships that are set to show and tell visibility. Any target user accounts that are flagged as private or do not share any common memberships with the searching user are not returned in the search results. The matching user and the filtered memberships results are provided to the searching user.

The user may also conduct a search of the server system 12 to find other users having matching interests or social media memberships. This type of search is useful in the case of a person wanting to seek people that have combinations of memberships within a certain geographical region and the user wants to browse a larger set of individuals and possibly friend them in various social media realms. Matches are found if the person's name matches the search query, are within a searched geographical region, and return only the search target's memberships that are visible to the searching user. To accomplish these searching criteria, the user selects the search option tab and also selects a geographical region to search. The user selects one or more social media membership types or categories such as social, gaming, or professional. The search is then conducted by the server system 12. The database of the server system 12 is searched to find individuals matching the search criteria. If a matching user is found, then the server system 12 checks to see if the matching user has any memberships exposed with either public or show and tell visibility. The server system 12 filters and returns only the resulting memberships that are exposed as public, as well as any memberships that are flagged as show and tell and are common with the searching user's memberships. Any target user accounts that are flagged as private or do not share a common membership with the searching user are not returned as a search result. Users and their filtered membership data results are returned to the customer device 18 for display.

If the user finds an individual as a result of a search then the user may add the individual to the user's contact list in the following manner. The search results have the ability to select one or more of the individuals found by the search. In particular, the user is allowed to send a friend request to each selected individual by selecting an appropriate button or tab associated with the individual. The targeted individual receives the request and is allowed to either accept or reject the request. Upon acceptance, the user and the target user are now linked in the server system 12. The new contact is added to the user's contact list and the target user's contact list. Optionally, the user may send a friend request outside of the server system 12. For example, the user may obtain the location of the target users' profile on each social network site (e.g., via a URL) and then contact the target user through each social network site.

The user may change the visibility hierarchy of each membership in the following manner. The user selects the My Memberships tab or button. Within the membership settings, the user selects one of their registered memberships. Once selected, the user is allowed to make changes to the saved settings. For example, one membership may have initially been identified as private and the user now wants to change the visibility to public. The public designation is selected in an edit screen and an update request is submitted to the server system 12. The server system updates the records of the account and the data is stored in the server system 12. The user has now successfully flagged one of the memberships as public that is visible globally to anyone who accesses the server system 12.

The user may set or change the visibility hierarchy to show and tell as follows. The user navigates on the web site to the My Memberships tab and selects this tab. Once selected, the user then is provided the opportunity to select one of their membership accounts to be edited. The user then changes the visibility status to Show and Tell. The server system 12 then updates the visibility status for this selected membership account in the database of the server system 12. The user has now flagged one of his or her media accounts as show and tell, and this account is visible to anyone in the system who is a user of the server system 12 and has a registered membership that matches the account/type of the user. This flags the visibility of the account to a more narrow scope than a public account. This also only includes the user in search or browsing results if the searching individual has a matching membership.

The user may also set a membership to the visibility status of Friends Only. Alternatively or in addition, the user may create groups with particular visibility such as relatives, acquaintances, best friends, etc. Friends Only status is more restricted and less visible than the Show and Tell status. The account only appears in a search where the searching individual is a friend of the user that is indicative of the searching user being on the user's contact list. Selecting or changing an account status to Friends Only may be completed in the following manner. The user navigates on the web site to the My Memberships tab and selects this tab. Once selected, the user edits the particular membership account to be changed by selecting the Friends Only button for visibility of this account. The server system 12 then updates the record for this account and stores this data. The account is now visible only to individuals in the server system 12 who are a user of the server system 12 and is a mutual contact of the user.

If the user wants to set an account as being a Friends Only-Show and Tell visibility status then the user may accomplish this in the following way. The user selects the My Memberships tab and selects the account for the status change. Once selected, the user may edit the account to have a Friends Only-Show and Tell visibility status. This revised setting is selected and an update request is submitted to the server system 12. The server system 12 updates the status and saves the status. Once the account is flagged as a Friends Only-Show and Tell visibility status, the account is only visible to anyone who is a user of the server system 12, is a mutual contact of the user, and has a matching membership account with the user.

A private account may be established in the following manner. The user is logged into the server system 12 and then selects the My Memberships tab on an appropriate screen or web page. Within the membership settings, the user selects one of the registered accounts to be edited or updated. The user then changes the status of the selected registered account to a Private visibility status. The server system 12 receives the updated request and then saves the request. The account is now flagged as a Private account, and the account is visible in the server system 12 to only the user and potentially to a "Best Friend" contact.

The user may also make any account as having Private Invisible status. Private Invisible status is only visible to the user and no one else. Again, to establish such a status, the user selects the My Memberships tab, selects the desired registered membership account to be changed, and then selects the Private Invisible status for that account. The request to edit the particular account is sent to the server system 12 and the server system 12 updates the account and saves the new status for the account. Once changed, the account immediately becomes a Private Invisible account only available to be viewed by the user.

Setting a contact as a Best Friend allows a user to have visibility into all of the user's memberships that are Private and higher visibility status. Being a Best Friend essentially overrides any visibility settings and ignores any show and tell settings the user may have with the exception of an account having Private Invisible status. As previously indicated, a Private Invisible status account is only visible to the user. To allow a contact to be a Best Friend, the user selects this status by clicking on a Best Friend button provided for a contact.

Information concerning events and messages about common interests or subscriptions may be allowed by the system 10. In order to accomplish this, the user sends a request to the server system 12 for "feed" data. The server system 12 accesses the events that best matches user interests, based on common interest, topic, subscription, or matching social media relevancy. The results of the search are forwarded to the user. The results are displayed for the events, messages, or notifications in the display associated with the customer device 18.

The user may also be proactive and search for information concerning events and messages about common interests or subscriptions. The user logs into the server system 12 and selects a search field or button. The user then searches for events and the search request is sent to the server system 12. The server system 12 accesses the events that match the user search criteria, based on common interest, subscription, or matching social media relevancy. The results of the search are sent to the user. The results are displayed in the customer device 18 for the user to view.

The user may also use the server system 12 to broadcast a message or an upcoming event across multiple third party systems. Once logged into the server system 12, the user selects a messaging button. The application 24 prompts the user for a type of message, audience, or category. The user then sends the message, event, or notification. The server system 12 determines the particular area or realm by querying data stored for the contact list and their attached memberships, categories, or topics to determine users and systems to which the message or event should be broadcast. Where applicable, the server system 12 passes through the transmission to the third party system if the third party systems allows such a transmission.

The user may further customize a universal feed, or universal streamer, that the user wishes to send through the server system 12. In this scenario, the user wants to improve the relevancy of the information that is presented in the server system 12 universal feed. The universal feed is responsible for streaming data to the user from the wider realm and to aggregate the data. The user may want to have more or less specific information presented, so the application 24 allows the user to customize relevant topics and have that stored in the user's profile in the data store in the server system 12. The user may select this option by selecting the universal feed option. Once selected, the user is presented with a web page in which the user may enter in updates, topics, feeds (e.g., newsfeeds), interests, hobbies, friends activities, or any other subject matter the user wants to have presented in the feed. The request is submitted to the server system 12. The server system 12 receives the request and updates the user settings in the data store of the server system 12.

Rather than the user separately attempting to follow all activities of interest from all the social networks (which is cumbersome and tiring), the universal feed accumulates all these feeds and display them in one location. Further, the user may select the feeds of interest by user (e.g., by contact), by site, by domain, and/or by other criteria. For example, the user may select other users who are family and close friends, and the social networks feeds of those selected users are coordinated into the universal feed. In another example, the user may select a particular network or domain (e.g., a gaming network), and the activities of contacts of the user who belong to the selected network or domain are coordinated into the universal feed. In this manner, the user receives updates on contacts who log into the selected network and/or domain (e.g., the users who have logged on to play games). The universal feed may also provide the user with an option to set up a home screen streamer for mobile devices or desktops to display the desired activity information on the home screen. In some embodiments, the universal feed presents the information as a large cross-tab user interface element in which the users are shown on the vertical axis, and the different domains/networks are shown on the horizontal axis. The user may select users (e.g., contacts, or selected users) across all networks, or select each network across all the users (e.g., contacts, or selected users).

Figure 2:
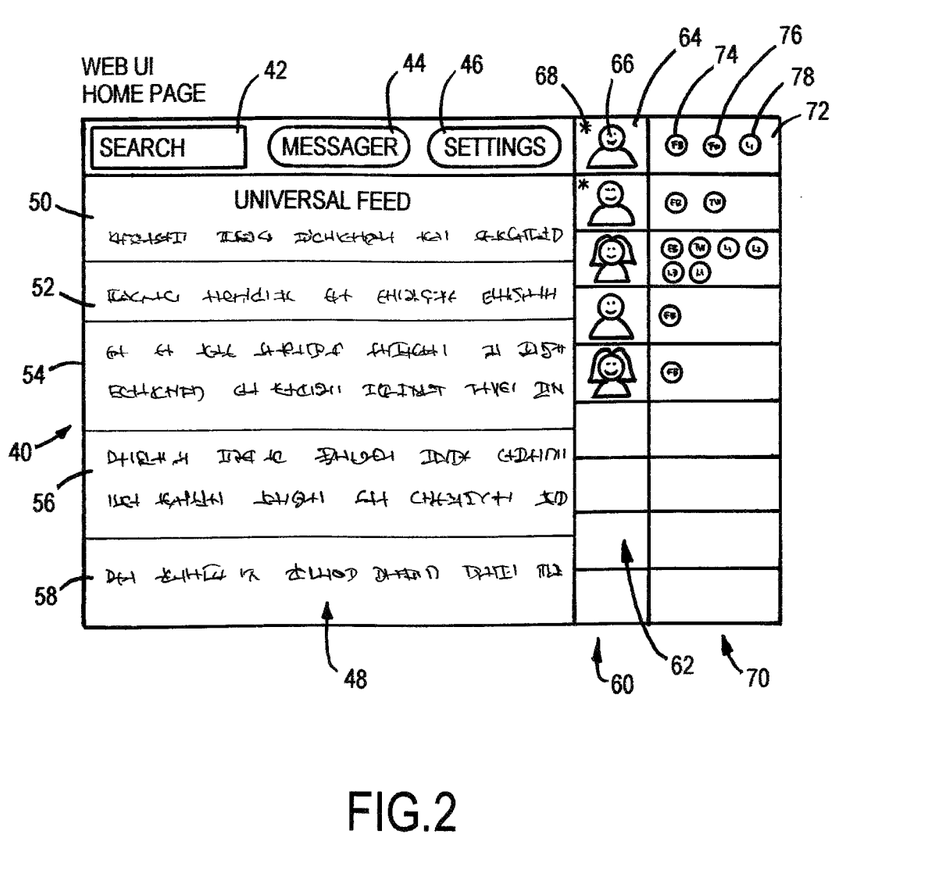
FIG. 2 is an illustration of an exemplary user interface which may be presented during use of the system for dynamically aggregating and configuring social networking access contacts constructed according to the disclosure.

FIG. 2 illustrates a screen or a web page 40 that may be displayed on the device 18 that has either accessed the website associated with the server system 12 or has installed therein the application 24. The screen 40 is a user interface and may be the home page for the website of the server system 12. The screen 40 has a search box 42 in which search parameters may be typed into the box 42. For example, if the user desired to determine if a friend is already a member of the system 10, then the user types in the name of the friend. Once the name is typed into the box 42, the enter key may be pressed to initiate the search. A message icon or button 44 and a settings icon 46 or button are also provided in the screen 40. The settings icon 46 may be operated to open another screen to edit memberships as explained in further detail herein. A scrollable area 48 is also presented in the screen 40 in which universal feed elements 50, 52, 54, 56, and 58 may be populated in the area 48. The universal feed elements 50, 52, 54, 56, and 58 may be customized or preset by the user, as has been previously described. For example, the first universal feed element 50 may be a story concerning a hobby of the user and the second universal feed element 52 may be a news article that may be of interest to the user. Although only universal feed elements 50, 52, 54, 56, and 58 are shown in this example, it is possible that more universal feed elements may be present in the scrollable area 48 by scrolling the area 48. The screen 40 also has a column 60 in which the contacts 62 of the user are displayed. A first contact 64 may have a photo 66 of the contact and also an indicator 68 that identifies the first contact 64 as a Best Friend contact. The first contact 64 may include other information about the first contact 64 such as the name of the contact and other contact information such as a cellphone number. The column 60 may also be scrollable if the number of contacts is large and cannot be displayed in the column 60. Another column 70 may be provided in the screen 40 to identify the social networking sites that the contacts 62 are members. For example, the first contact 64 has an adjacent box 72 in which logos 74, 76, and 78 are presented to identify the social networking sites that the first contact 64 is a member.

Figure 3:
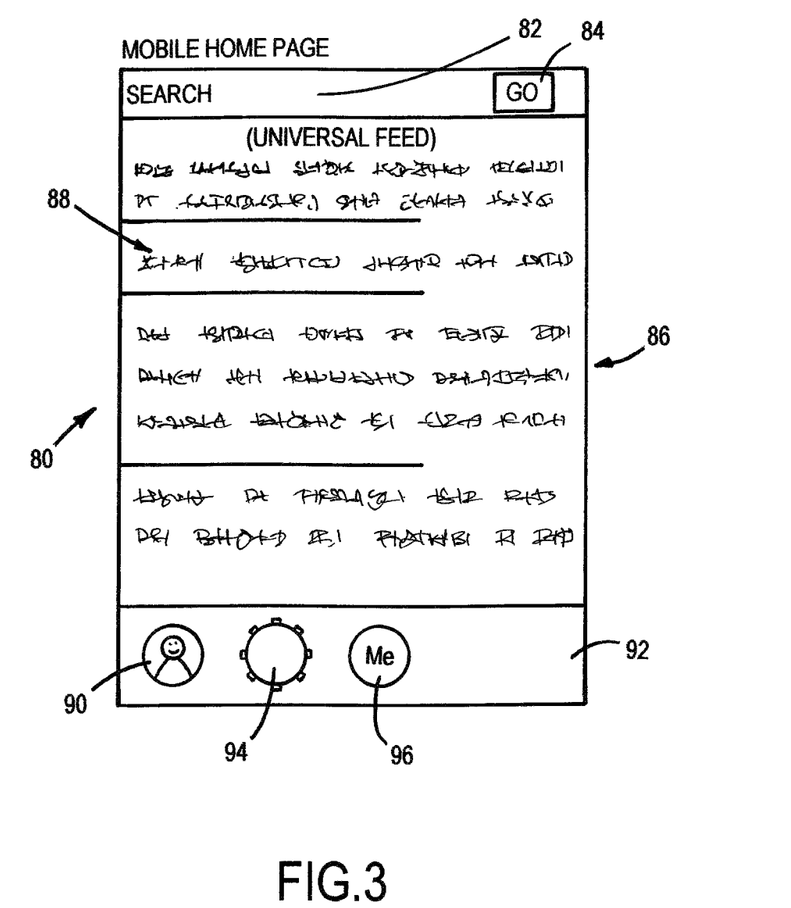
FIG. 3 is an illustration of another exemplary user interface which may be presented during use of the system for dynamically aggregating and configuring social networking access contacts constructed according to the disclosure.

With reference now to FIG. 3, a screen 80 is shown which is displayed on the customer device 18 if the customer device 18 is a smart phone. The screen 80 may include a search box 82 in which search parameters may be typed into the box 82. Once a search request is typed into the box 82, an icon 84 may be selected to start the search. A scrollable area 86 is provided in the screen 80 in which universal feed elements 88 may be placed. A contacts icon 90 or button may be resident in a bar area 92. The contacts icon 90 may be selected to open another screen in which the contacts of the user are displayed. A settings icon 94 is also provided in the bar area 92. The settings icon 94 may be pressed to be directed to another screen in which the settings of the user may be entered or edited. The bar area 92 also has a memberships button 96. Selection of the memberships button 96 opens a new screen in which memberships information may be viewed. The screen 80 is a more condensed version of the screen 40. Further, the cellphone may have a touch sensitive screen that allows the user to touch the screen 80 and the various elements, for example icon 90, to operate or control the screen 80. However, it is also possible that the screen 40 may be presented on a cellphone.

Figure 4:
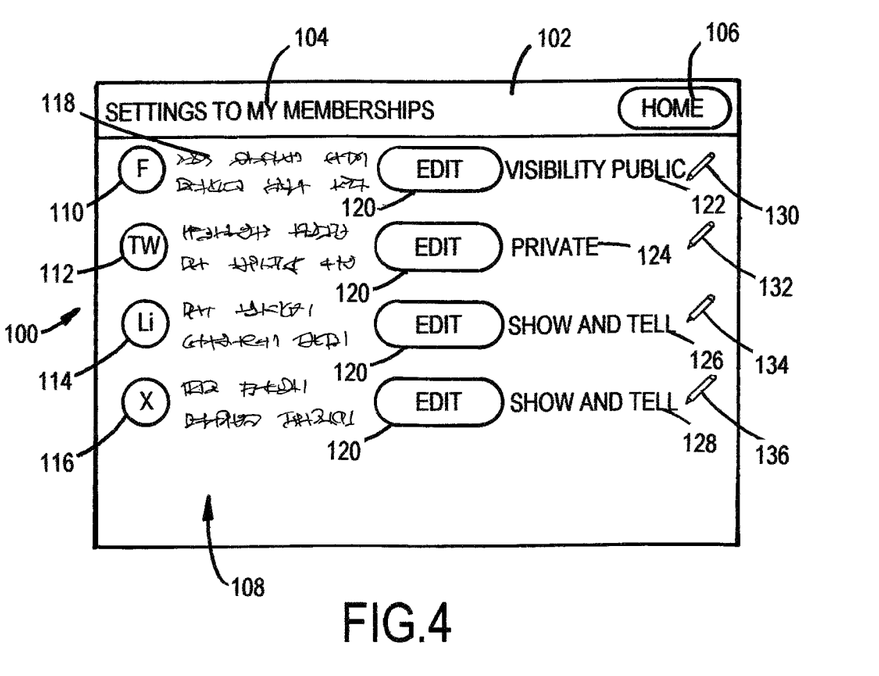
FIG. 4 is an illustration of another exemplary user interface which may be presented during use of the system for dynamically aggregating and configuring social networking access contacts constructed according to the disclosure.

FIG. 4 depicts a screen 100 that may be displayed when the user has selected the icon 46 on the screen 40. The screen 100 is used to edit or add a membership to a social networking site by the user. The screen 100 has an area 102 in which the name or status 104 of the screen 100 is displayed. A home icon 106 or back icon is also provided in the area 102. The home icon 106 may be pressed to return to the screen 40 once the user has completed entering information on the screen 100. The screen 100 has an area 108 or other portion in which the memberships 110, 112, 114, and 116 that the user is a member of is displayed. Each of the memberships 110, 112, 114, and 116 has an area 118 in which membership information is shown. Membership information may include the name of the social networking site and the URL for the social networking site. An edit icon or button 120 is provided for the user to select to be directed to another screen to edit information for the memberships 110, 112, 114, and 116. Each of the memberships 110, 112, 114, and 116 has a visibility status indicator 122, 124, 126, and 128, respectively. For example, the membership 110 is indicated as being public, the membership 112 is indicated as being private, and the memberships 114 and 116 are indicated as being show and tell. The status indicator 122 may be changed or edited by selecting a quick edit icon 130. Once the icon 130 is selected, a menu may open which provides the various statuses that may be selected. For example, the status indicator 122 for the membership 110 may be changed from Public to Private. The memberships 112, 114, and 116 also have an associated quick edit icon 132, 134, and 136, respectively. Although not shown, the screen 100 may have other options or icons that may be selected. For example, an add icon may be present on the screen 100 to add a new social networking site membership The screen 100 is used to change visibility settings or status, add new memberships, remove memberships, or customize information for any specific membership.

Figure 5:
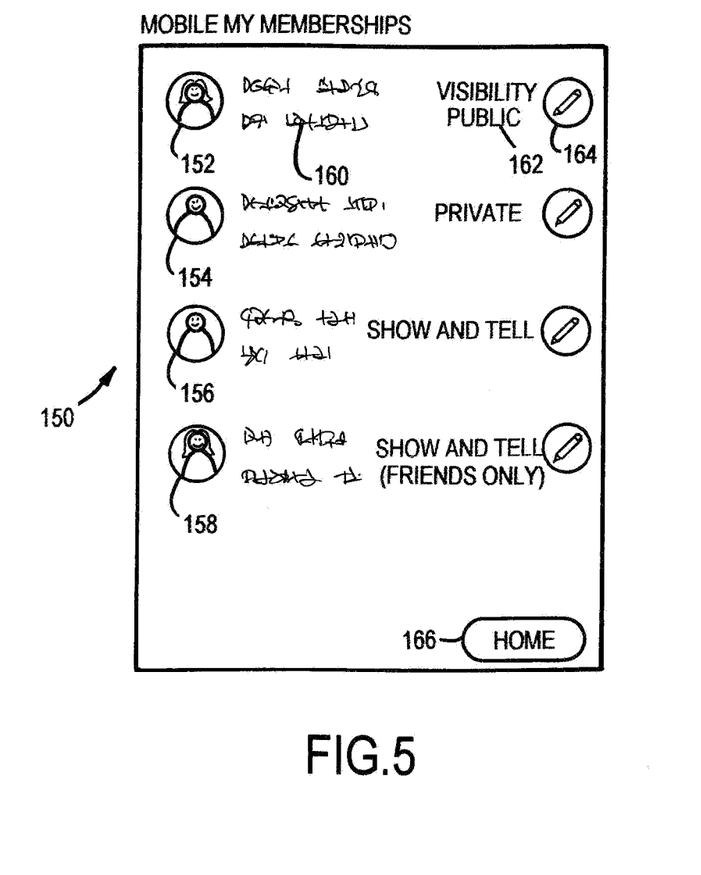
FIG. 5 is an illustration of another exemplary user interface which may be presented during use of the system for dynamically aggregating and configuring social networking access contacts constructed according to the disclosure.

With reference now to FIG. 5, a screen 150 is shown that may be displayed to the user when the device 18 is a smart phone. The screen 150 is used to edit or add membership information for the user. The screen 150 is a condensed version of the screen 100. Further, the screen 150 is presented once the icon 94 on the screen 80 has been selected. The screen 150 has displayed therein social networking sites 152, 154, 156, and 158 that the user is a member. The social networking site 152 has an area 160 in which membership information is shown. The social networking site 152 has a visibility status indicator 162 that in this particular case indicates the status as being Public. A quick edit icon 164 is also provided to be able to edit the status of the social networking site 152. The other social networking sites 154, 156, and 158 have similar elements. A home icon 166 is also provided in the screen 150 to be able to return to the screen 80.

Figure 6:
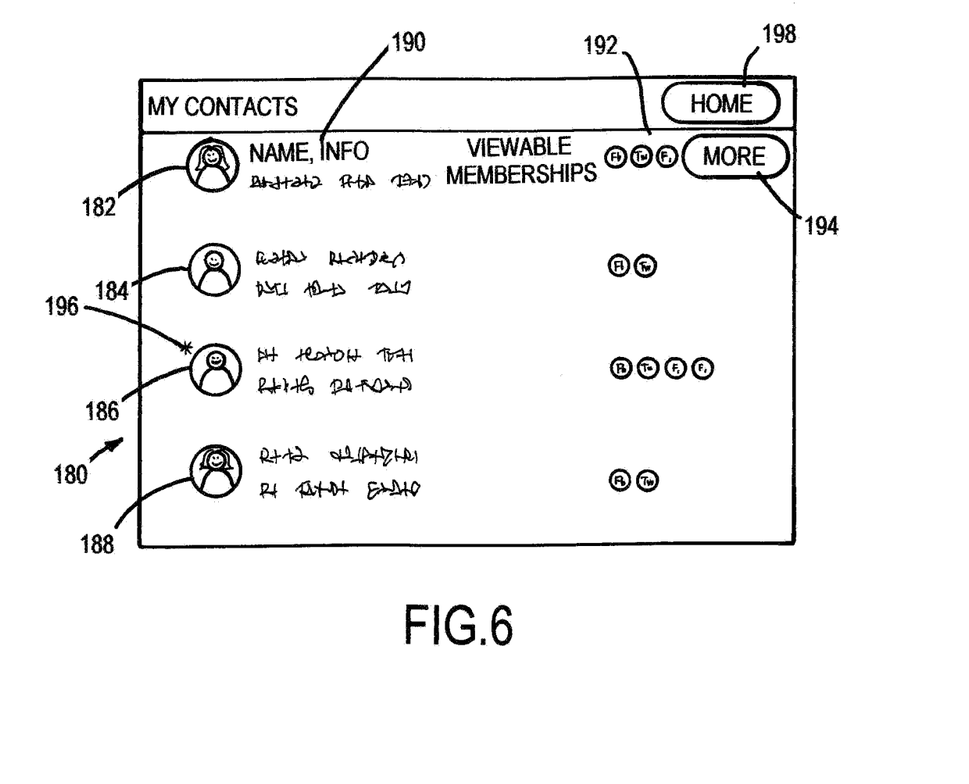
FIG. 6 is an illustration of another exemplary user interface which may be presented during use of the system for dynamically aggregating and configuring social networking access contacts constructed according to the disclosure.

FIG. 6 shows a screen 180 that may be used to review and edit the contacts that the user of the system 10 has accumulated. The screen 180 has a first contact 182, a second contact 184, a third contact 186, and a fourth contact 188. Although only four contacts 182, 184, 186, and 188 are shown, it is possible that more contacts may be displayed or that the screen 180 may be scrollable to view other contacts. The first contact 182 has an area 190 in which information is displayed such as the name of the first contact 182. The first contact 182 also has associated therewith an area 192 in which the memberships that the first contact 182 is a member of are displayed. A button or icon 194 is also provided to find out more details about the first contact 182 or to edit the first contact 182. The third contact 186 has an indicator 196 to identify the third contact 186 as a Best Friend. A home button 198 is also provided to return to the home page such as the screen 40 or the screen 80.

Figure 7:
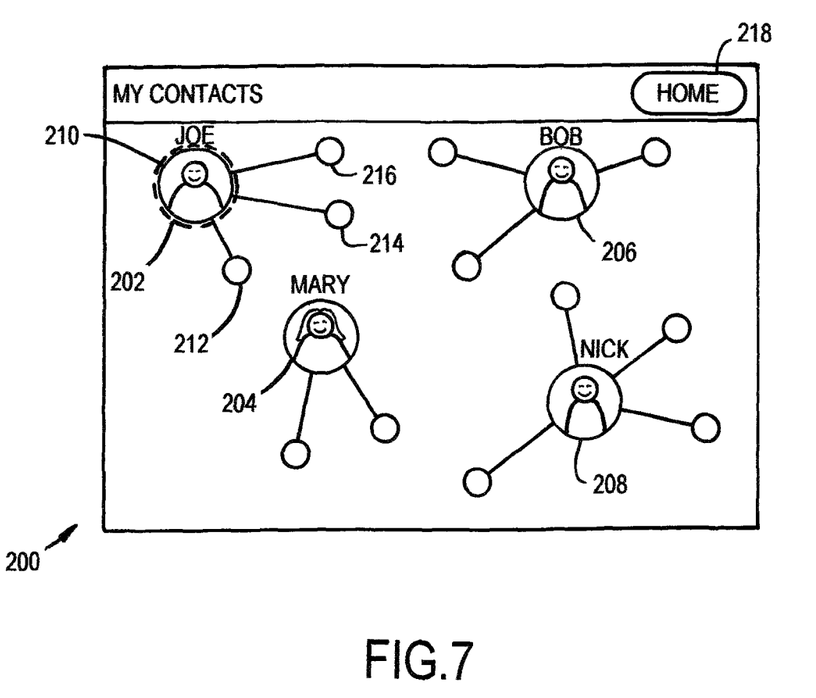
FIG. 7 is an illustration of another exemplary user interface which may be presented during use of the system for dynamically aggregating and configuring social networking access contacts constructed according to the disclosure.

Referring now to FIG. 7, an alternative screen 200 to the screen 180 is shown. The screen 200 is used to review or edit the contacts list of the user. The screen 200 has a first contact 202, a second contact 204, a third contact 206, and a fourth contact 208. The contacts 202, 204, 206, and 208 may be moved or dragged within the screen 200 to design the screen 200 in any desired manner. The first contact 202 has a ring or halo 210 around it to indicate that the first contact 202 is a Best Friend. Attached to the first contact 202 are nodes 212, 214, and 216 that are indicative of the social networking sites that the first contact 202 is a member. The nodes 212, 214, and 216 have an animated appearance and are capable of moving or floating on the screen 200. This provides a more interactive and fun appearance to the user. Each of the nodes 212, 214, and 216 may be clicked or selected to find out more details about the first contact 202 or to edit the first contact 202. A home button or icon 218 is provided to allow the user to return to the screen 40 or the screen 80.

Figure 8:
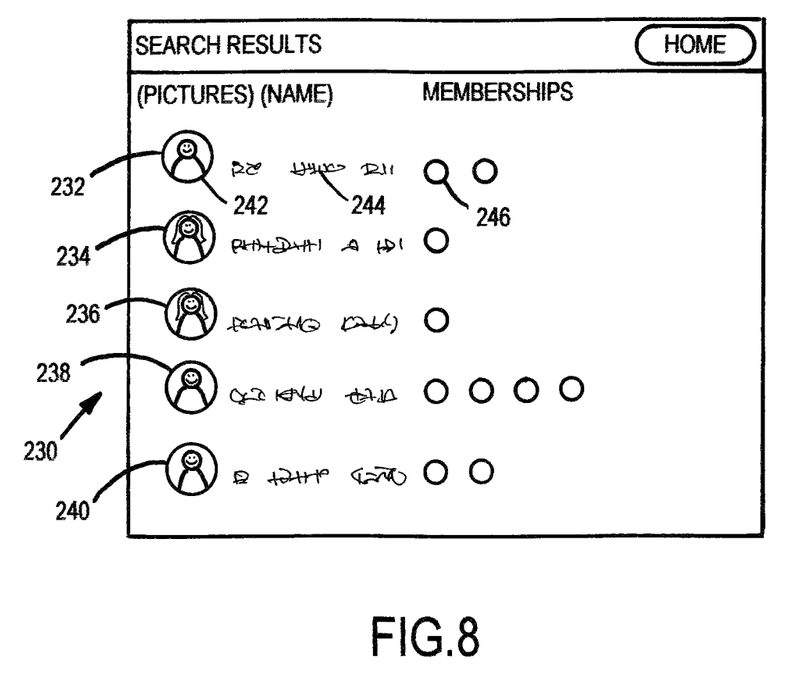
FIG. 8 is an illustration of another exemplary user interface which may be presented during use of the system for dynamically aggregating and configuring social networking access contacts constructed according to the disclosure.

FIG. 8 illustrates a screen 230 that is presented to the user to show the results of a search request that was initiated by use of the search box 42 feature of the screen 40 or the search box 82 feature of the screen 80. If, for example, a search was conducted to determine potential contacts that resided in a specific geographical area then the search results would be presented in the screen 230 as five results 232, 234, 236, 238, and 240. The first result 232 may contain information such as a picture 242 of the contact, the name 244 of the contact, the social networking sites 246, if any, that the contact is a member. The social networking sites 246 are the sites that the contact has indicated in the system 10 to be visible in such a search of the system 10. As can be appreciated, by use of the system 10, a member or user may restrict what search results are visible to a searching user. The search results 232, 235, 236, 238, and 240 appear as a list in the screen 230. The ordering of the search results may be handled by the server system 12. It is also possible that the user may be able to sort the search results once the results are posted. For example, the user may be able to refine the search by eliminating any potential contacts who are not members of a social networking site, such as the search result 236. Further, the user may be able to sort the search results by memberships, topics, common interests, or other criteria.

Figure 9:
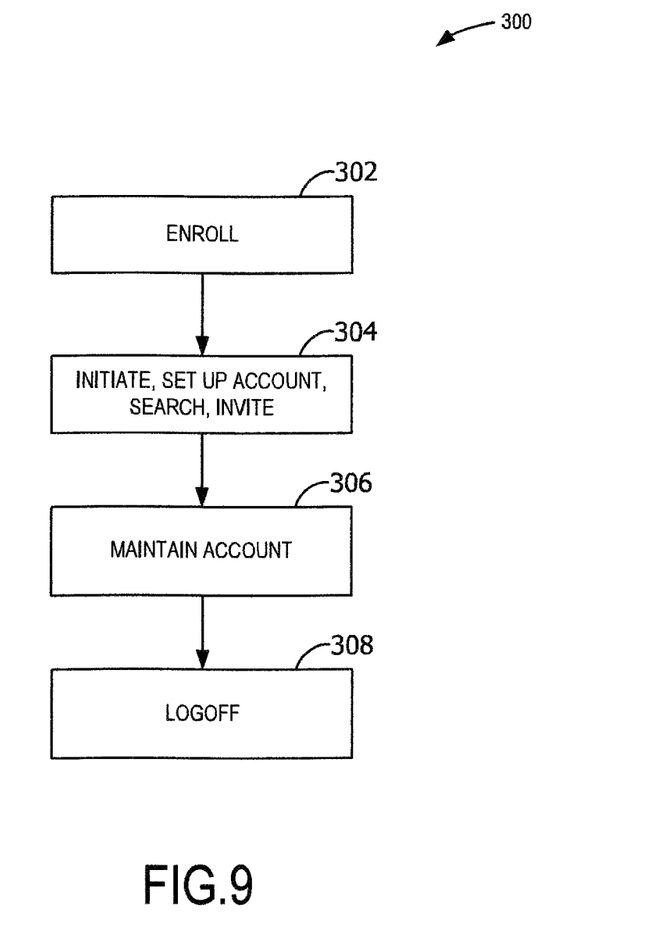
FIG. 9 is a flow chart diagram of an operation of a method for dynamically aggregating and configuring social networking access contacts constructed according to the disclosure.

FIG. 9 is a flow chart diagram 300 of the general operation of the system 10. In an initial step 302, a user or customer enrolls in system 10 being offered by the server system 12. The user may enroll in the system 10 by use of various methods. For example, the user may see an ad on a website that the system 10 is available and the user is directed to the website of the server system 12 to enroll in the system 10. The system 10 may also have an ad in a magazine having a QR code that the user may scan by use of the customer's device 18 to be directed to a website to enroll in the system 10. As has been previously indicated, the enrollment process may include the user entering information such as the customer's name, email address, and a password. Once the user has enrolled in the system 10, the user may begin to use the system 10. As has been described above, part of the enrollment process includes an authentication step and a verification step to set up an account on the system 10.

In a next step 304, the user may initiate the user's account by adding one or more social networking sites or accounts of which the user is member, setting up visibility status for each of the sites or accounts, conducting a search to find potential contacts, inviting known friends or contacts at various social networking sites to join the user in the system 10, and various other actions that have already been discussed herein. In a next step 306, over time and after repeated use of the system 10, the user may conduct maintenance of the user's account by editing various items in the user's account. For example, the user may want to delete a particular contact. By use of the system 10, the user may easily delete one or more contacts in the user's account. After the user has determined that the user has completed a session on the website of the server system 12, the user may log off from the server system 12. This is indicated in a last step 308. As can be appreciated, the next time the user logs into the server system 12, the steps 304, 306, and 308 may be performed in any order. It is also possible that more steps may be included in the use of the system 10. The various steps 302, 304, 306, and 308 outlined above are general steps to be used in the operation and control of the system 10.

As has been described, the system 10 may be a service provided at a website associated with the server system 12. The service and the user interfaces, such as the screens 40, 80, 100, 150, 180, 200, and 230, facilitate and allow users of the system 10 to search and connect with each other among many disparate social media memberships. The system 10 is a facilitator of person-to-person connectivity. Some social networking sites have their own set of friend lists, but there is no easy way to find one another without searching within the scope of each individual social media system. The system 10 is capable of aggregating and facilitating that interaction in a more global scope. When a person becomes a friend with another person in real life, these two individuals may use the system 10 to link up all their disparate memberships to one another. The system 10 may also be used to locate and friend or contact another person solely on common interests and memberships.

Although the user of the system 10 has been described as being an individual, it is also possible that the user may be an organization, public group, interest group, or any other entity such as a religious group or a political group. It is also contemplated that private networking sites may be part of the system 10. For example, members of a private club, a business organization, or a fraternal organization may use the system 10 and only users who are members of the private networking site may be able to view other members.

The order of execution or performance of the operations in embodiments of the system and method illustrated and described herein is not essential, unless otherwise specified. That is, the operations may be performed in any order, unless otherwise specified, and embodiments of the system and method may include additional or fewer operations than those disclosed herein. For example, it is contemplated that executing or performing a particular operation before, contemporaneously with, or after another operation is within the scope of aspects of the disclosure.

When introducing elements of aspects of the system and method or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, systems, and methods without departing from the scope of aspects of the disclosure, it is intended that all matter contained in the above description and shown in the accompanying drawings shall be interpreted as illustrative and not in a limiting sense.

From all that has been said, it will be clear that there has thus been shown and described herein a system and method for dynamically aggregating and configuring access to social networking contacts which fulfills the various advantages sought therefore. It is apparent to those skilled in the art, however, that many changes, modifications, variations, and other uses and applications of the subject system and method for dynamically aggregating and configuring access to social networking contacts are possible and contemplated. All changes, modifications, variations, and other uses and applications which do not depart from the spirit and scope of the disclosure are deemed to be covered by the disclosure.

What is claimed is:

1. A system for dynamically aggregating and configuring access to a plurality of social networking contacts comprising:

a server system receiving information from one or more users enrolled into the server system, the information comprising a list of social networking accounts of which each of the users is a member and a visibility status associated with each of the social networking accounts, the server system further providing a first list of social networking accounts having a first visibility status of a first user of the server system to a second user of the server system when the second user has a second list of social networking accounts that corresponds to the first list of social networking accounts set to the same visibility status as the first visibility status of the first list of social networking accounts, the second list of social networking accounts comprising at least one social networking account matching at least one social networking account in the first list of social networking accounts, each networking account in the second list of social networking accounts is set to the first visibility status, wherein the server system searches the server system to find other users having a similar list of social networking accounts as the first list of social networking accounts and returns social networking account memberships matching social networking memberships of the first user set to show and tell visibility, wherein any social network accounts of other users that do not share common memberships with a searching user are not returned in the search results.

2. The system for dynamically aggregating and configuring access to social networking contacts of claim 1 wherein the visibility status includes one or more of the following: public, show and tell, friends only, friends only-show and tell, private, and private invisible.

3. The system for dynamically aggregating and configuring access to social networking contacts of claim 1 wherein the visibility status includes a show and tell level, wherein a social networking account of a social network having a visibility status set to the show and tell level by the first user is provided to other users having a social networking account in the same social network with a visibility status set to the show and tell level.

4. The system for dynamically aggregating and configuring access to social networking contacts of claim 1 wherein the visibility status includes a friends only-show and tell level, wherein a social networking account of a social network having a visibility status set to the friends only-show and tell level by the first user is provided to other users included in a contact list of the first user having a social networking account in the same social network with a visibility status set to the friends only-show and tell level.

5. The system for dynamically aggregating and configuring access to social networking contacts of claim 1 wherein the server system deletes any connection to the second user in response to a request from the first user.

6. The system for dynamically aggregating and configuring access to social networking contacts of claim 1 wherein the server system changes the visibility status of at least one of the social networking accounts in the first list of social networking accounts to another visibility status.

7. The system for dynamically aggregating and configuring access to social networking contacts of claim 1 wherein the server system sends a universal feed to the first user.

8. A system for dynamically aggregating and configuring access to social networking accounts comprising:

a server system receiving information from one or more users enrolled into the server system, the information comprising a list of social networking accounts of which each of the users is a member and a visibility status associated with each of the social networking accounts;

the server system providing a first list of social networking accounts having a first visibility status of a first user of the server system to a second user of the server system when the second user has a second list of social networking accounts that corresponds to the first list of social networking accounts set to the same visibility status as the first visibility status of the first list of social networking accounts, the second list of social networking accounts comprising social networking accounts matching social networking accounts in the first list of social networking accounts, each networking account in the second list of social networking accounts is set to the first visibility status wherein the server system searches information of the first user in response to a request from the second user, wherein social networking account memberships of other users shared in common with the second user and set to a show and tell visibility status are returned to the second user, and wherein social networking accounts that are not shared in common with the second user are not returned to the second user; and a first customer device of the first user having a screen and executing an application for the server system, the application transmitting the information comprising the first list of social networking accounts and the first visibility status of each account in the first list of social networking accounts to the server system, and the first customer device receiving various screens from the server system.

9. The system for dynamically aggregating and configuring access to social networking contacts of claim 8 wherein the visibility status includes one or more of the following: public, show and tell, friends only, friends only-show and tell, private, and private invisible, wherein a social networking account of a social network having a visibility status set to the show and tell level by the first user is provided to other users having a social networking account in the same social network with a visibility status set to the show and tell level.

10. The system for dynamically aggregating and configuring access to social networking contacts of claim 8 wherein the first customer device communicates with the server system to edit information of the first user.

11. The system for dynamically aggregating and configuring access to social networking contacts of claim 8 wherein the first customer device communicates with the server system to delete any connection to the second user in response to receiving a request from the first user.

12. The system for dynamically aggregating and configuring access to social networking contacts of claim 8 wherein the first user searches the server system via the first customer device to find other users having a similar list of social networking accounts as the first list of social networking accounts.

13. The system for dynamically aggregating and configuring access to social networking contacts of claim 8 wherein the server system changes the visibility status of at least one of the social networking accounts in the first list of social networking accounts to another visibility status in response to a request from the first customer device.

14. A method for dynamically aggregating and configuring access to social networking accounts comprising:

enrolling, by a computing device, a plurality of users in a system for dynamically aggregating and configuring access to social networking accounts of the plurality of users;

receiving, by the computing device, membership account information for each social networking account of the plurality of users;

setting, by the computing device, a visibility status for each social networking account for each account to be visible to users in the plurality of users having a corresponding account set to the same visibility status;

filtering the social networking accounts of the plurality of users based on the visibility status before presenting the social networking accounts to the plurality of users, wherein memberships associated with social networking accounts of other users that are shared in common with a searching user is returned to the searching user, and wherein memberships of other users associated with social networking accounts that are not shared in common with the searching user are not returned in the search results; and providing a first list of social networking accounts having a first visibility status of a first user to a second user, the first list of social networking accounts comprising a networking account of a social network set to the first visibility status by the first user, the second user having a corresponding social networking account of the same social network set to the first visibility status.

15. The method for dynamically aggregating and configuring access to social networking accounts of claim 14 further comprising changing the setting of the visibility status for at least one of the social networking accounts.

16. The method for dynamically aggregating and configuring access to social networking accounts of claim 14 wherein the visibility status comprises one or more of the following: public, show and tell, friends only, friends only-show and tell, private, and private invisible, wherein a first social networking account membership of the first user set to a friends only-show and tell visibility is only visible to another user of the system having a matching social networking account membership and a mutual contact of the first user.

17. The method for dynamically aggregating and configuring access to social networking accounts of claim 14 further comprising editing membership account information for each social networking account.

* * * * *